Aug. 8, 1961   G. A. LYON   2,995,402
WHEEL COVER
Filed March 22, 1957   2 Sheets-Sheet 2
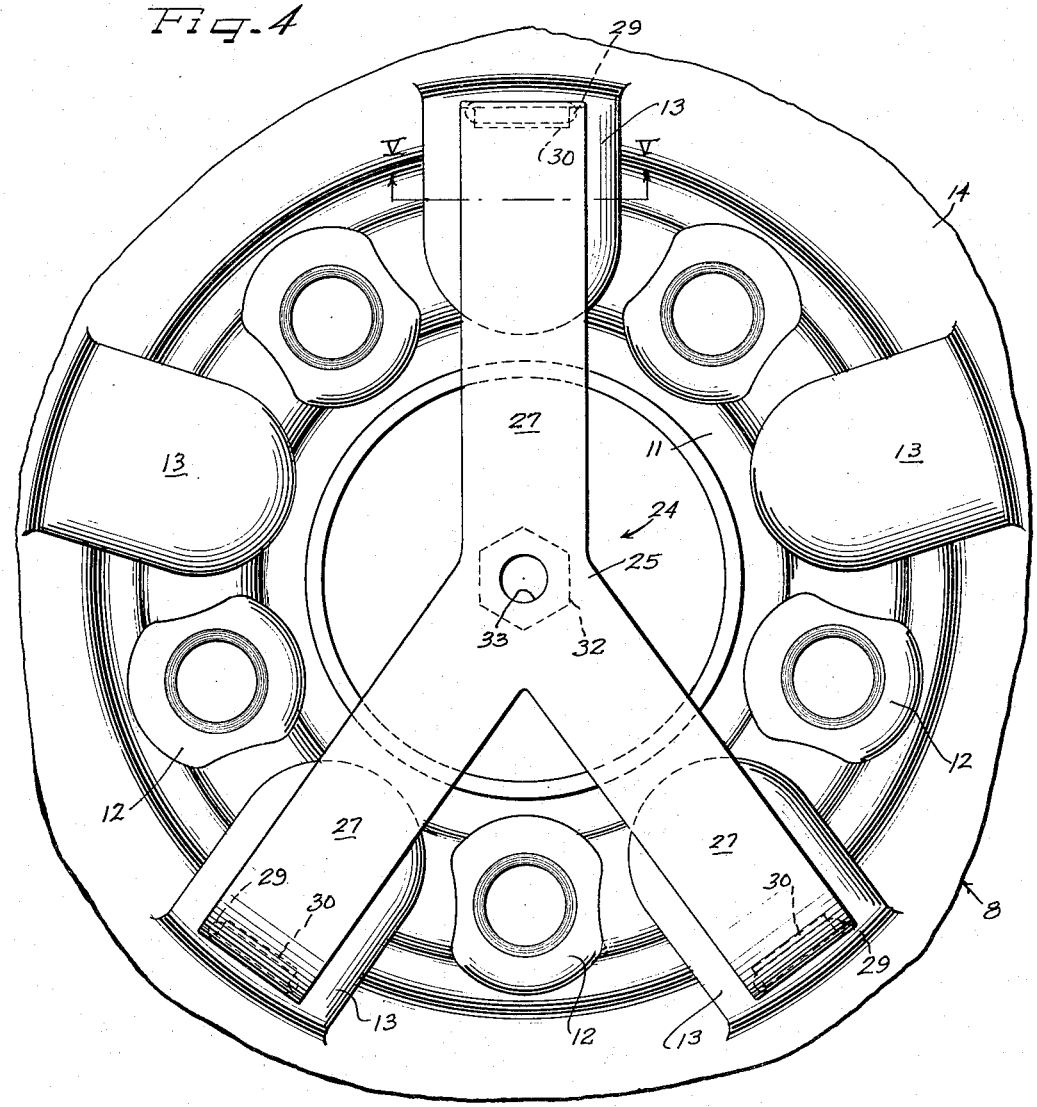
Fig. 4
Fig. 5
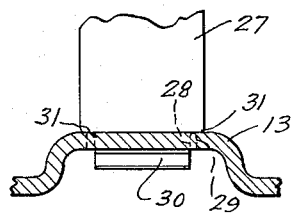
Inventor
GEORGE ALBERT LYON

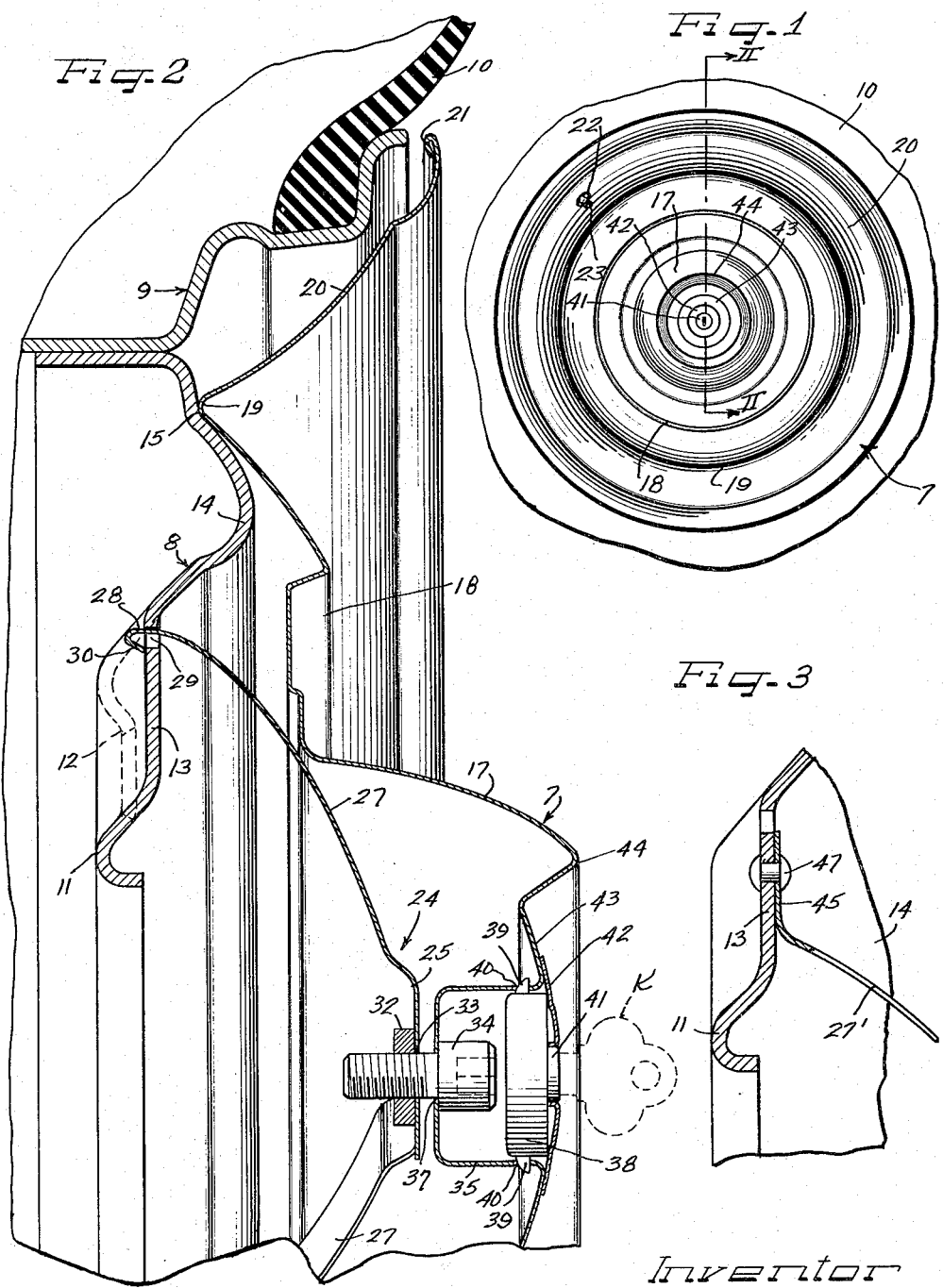

United States Patent Office 2,995,402
Patented Aug. 8, 1961

2,995,402
WHEEL COVER
George Albert Lyon, 13881 W. Chicago Blvd.,
Detroit, Mich.
Filed Mar. 22, 1957, Ser. No. 647,767
4 Claims. (Cl. 301—37)

The present invention relates to improvements in wheel structures and more particularly concerns the ornamental and protective covering of the outer sides of vehicle wheels.

One of the problems now confronting automobile owners is the theft of wheel covers. This is an especially aggravating problem where the covers are of the more expensive types.

It is accordingly an important object of the present invention to provide a substantially theft proof wheel cover construction.

Another object of the invention is to provide an improved centrally attached cover construction for vehicle wheels.

A further object of the invention is to provide an improved wheel structure providing novel cover retaining means for central attachment of a cover.

Other objects, features and advantages of the present invention will be readily apparent from the following detailed description of certain preferred embodiments thereof taken in conjunction with the accompanying drawings in which:

FIGURE 1 is an outer side elevational view of a wheel structure embodying features of the invention;

FIGURE 2 is a diametrical enlarged fragmentary sectional detail view taken substantially on the line II—II of FIGURE 1;

FIGURE 3 is a fragmentary sectional detail view through a modification;

FIGURE 4 is an enlarged fragmentary elevational view of the central or bolt-on flange portion of the wheel body of FIGURE 2 showing the cover retaining means in place thereon; and FIGURE 5 is a fragmentary sectional detail view taken substantially on the line V—V of FIGURE 4.

A wheel cover 7 is adapted to be applied in covering disposition over the outer side of a vehicle wheel including a disk spider wheel body 8 supporting a multi-flange drop center tire rim 9 adapted to have mounted thereon a pneumatic tire 10.

The wheel body 8 has a central inwardly dished or depressed bolt-on flange 11 provided with the usual five apertured attachment bolt circumferentially spaced bosses 12 and also provided between such bosses with radially extending axially outwardly raised rib-like embossments 13 which merge at their radially outer ends into the radially inner side of a nose bulge 14. At the radially outer side of the nose bulge 14 adjacent to juncture with the tire rim is an annular indentation 15.

By preference, the cover 7 is made from suitable sheet metal that is adapted to be press worked or drawn into shape from a suitable blank of the sheet metal strip or sheet stock. Stainless steel, brass, aluminum alloy, or the like are suitable materials. Centrally the cover has a generally axially outwardly projecting domed crown portion 17 of a diameter to overlie the central portion of the bolt-on flange 11. About the crown 17 is an annular intermediate portion 18 for overlying the nose bulge 14 and extending at its radially outer side generally radially outwardly and axially inwardly to a generally axially inwardly extending annular juncture rib 19 where it joins a generally radially and axially outwardly extending outer marginal cover portion 20 of a diameter to overlie the outer side of the tire rim in spaced relation and having the extremity edge thereof turned under to provide a finishing and reinforcing extremity 21 arranged to lie in the assembly in spaced relation to the tip of the usual terminal flange of the tire rim. A valve stem aperture 22 in the cover portion 20 accommodates a valve stem 23 therethrough.

Means are provided for retaining the cover 7 entirely upon the outer side of the wheel body 8. For this purpose, the indented intermediate rib 19 of the cover is preferably of a diameter to fit snugly against the radially outer side of the nose bulge 14 of the wheel body within the indented groove 15. Thus the cover is held centered upon the wheel and since the nose bulge 14 is telescoped thereinto transverse or diametric support for the cover is provided by the nose bulge and road shocks are countered thereby so that the cover is held positively against transverse or diametrical displacement.

For retaining the cover in axial disposition on the wheel, a central attaching structure 24 (FIGS. 2 and 4) is provided. This includes a spider member 25 including a plurality of arms 27 adapted to bridge over and engage the wheel body at the radially outer margin of the wheel body flange 11. The arms or legs 27 extend in longitudinally arched form generally radially outwardly and axially inwardly from a central connecting body portion of the spider 25 and have means at their distal ends for connecting each of the legs to a respective one of the embossments 13 of the wheel body. In the present instance, there are three of the arms 27, although there could be five of such arms if preferred. The spacing between the arms 27 enables access to attachment bolts (not shown) for the wheel engaging the attachment bolt perforation bosses 12. The length of the arms 27 is such that they will support the central portion of the spider member 25 in ample axially outwardly spaced relation to clear the cover attaching structure 24 with respect to a central hub of a wheel axle to which the wheel may be attached.

In a preferred form which enables the cover assembly to be supplied as optional equipment, attachment of the distal end portions of the cover retaining spider arms 27 to the wheel is effected in a snap-on manner. To this end, each of the arms 27 is provided with a terminal portion 28 which is adapted to extend through a respective aperture or slot 29 in the radially outer portion of the respective wheel body embossment 13. Each of the slots 29 is preferably slightly longer than the width of the terminal portion 28 but substantially narrower than long although preferably several times as wide as the thickness of the arm terminal portion. Through this arrangement, the arm terminal portion 28 is readily engageable through the respective slot 29.

Self-locking of the arm terminals 28 within the respective slots 29 is effected by providing the terminal portions 28 with return-bent, and in this instance generally radially inwardly and axially outwardly directed respective locking terminal flanges 30 which are resiliently flexible to be compressed, from a wider spacing from the divergently related terminal portion 28 than the width of the respective apertures 29, to the aperture or slot width in projecting the terminal through the slot. After the terminal locking flange 30 has passed entirely through the slot 29 it snaps open to its normal position so that the tip thereof will extend beyond the adjacent inner edge defining the slot 29. Since the arms 27 are in the present instance constructed to resiliently tend to spread at least slightly to a larger diameter than described about the radially outer sides of the slots 29, it will be apparent that after the locking terminal flanges 30 are engaged behind the wheel body portion 13, the arms 27 are held against unintentional withdrawl from the slots.

Axially inward displacement of the arms 27 relative to the wheel body portions 13 is prevented by respective shoulder means provided on the arms adjacent to the terminals 28. In the present instance such shoulder means comprise respective shoulders 31 (FIG. 5) facing generally axially inwardly at the respective opposite sides of the terminal portions 28. Such shoulders 31 may be provided by having the arms 27 somewhat wider than the terminal portion 28 so that the shoulders are provided adjacent juncture of the terminals 28 with the wider body portions of the respective arms 27. The axial spacing between the tips of the locking flanges 30 and the shoulders 31 is such that the shoulders 31 will make full contact with the axially outer surface of the wheel portion 13 beyond the respectively opposite ends of the arm terminal receiving slot 29 as the locking terminal flange 30 springs open into its locking relationship when the terminal 28 is projected through the slot 29. While the terminal flanges 30 will retain the locked condition of the arms 27 against unintentional displacement, removal of the spider member can be effected by engagement of the terminal portions 28 from the inside of the wheel body and pressing the terminal flanges 30 closed sufficiently to enable withdrawal through the slot 29.

Centrally the spider 25 is provided with means for attachment of the cover 7 thereto under tensioned, rattle-free engagement. For this purpose, the center of the spider member body is provided with a threaded boss or lug such as a nut-like member 32 fastened to the inner side of the spider body and coaxially aligned with an axial aperture 33 to receive the threaded shank of an attachment screw 34 which may be of the socket head bolt type.

Centrally the cover crown 17 is preferably provided with an inset or depressed portion 35 providing a well or recess centrally in the bottom of which is a screw aperture or hole 37 through which the shank of the screw 34 is extendible axially inwardly, on the axis of the cover 7 with the head of the bolt engaging against the bottom wall of the recessed portion 35. Thus, after the cover 7 has been applied to the outer side of the wheel with the annular inset rib 19 thereof fitting into the groove 15 of the wheel body, and in which position the crown portion 17 of the cover is centered over the bolt-on flange 11 in spaced relation to the retaining spider 25, the connecting bolt or screw 34 is threaded into the threaded central connecting element 32 of the spider and the cover 7 drawn toward the spider and the spider drawn toward the cover to effect a tensioned retention of the cover by the spider. Since the spider legs 27 are arched, it will be appreciated that there is sufficient give or resilient deflectability therein to enable a substantial amount of tensioning by drawing up thereof toward the cover. As a result, the cover is held quite firmly against the wheel and free from any substantial movement or rattling on the wheel in service.

By having the retaining screw 34 and more particularly the head thereof disposed well inside the outer side or edge of the recess provided by the inset portion 35 of the cover crown, it is readily practicable to provide theft-preventing locking means to preclude unauthorized access to the attachment bolt or screw 34. Such locking means in a preferred form comprises a body member 38 of a diameter to fit within the axially outer portion of the wall defining the inset portion 35 and provided with a plurality of radially extending spring biased retractable bolts 39 engageable in keeper apertures 40 in the axial wall of the depressed or recess portion 35 as best seen in FIGURE 2. Within the lock body 38 may be provided any suitable lock mechanism of tumbler or other variety including a rotary central plug 41 into which a key K is adapted to be removably inserted for operating the lock for retracting the bolts 39 when it is desired to remove the lock body 38. Application of the lock body 38 is effected simply by pressing it axially inwardly into position until the retractable and normally spring biased bolts 39 snap into the keeper apertures 40. It will be appreciated that since the lock device 38 is centrally located on the wheel cover it presents no problem of unbalancing the wheel.

A neat cover and rattle preventing tensioning means for the lock device 38 comprises a resilient escutcheon plate 42 which is carried in suitably attached relation on the outer side or end of the lock device 38. The escutcheon plate 42 may be made from suitable resilient sheet metal and has the margin thereof extending substantially beyond the perimeter of the lock body 38 so as to overlap in tensioned thrusting engagement against an annular lateral flange portion 43 about the opening to the central bolt and lock recess in the cover crown. The flange 43 it will be observed in FIGURE 2 slopes generally radially outwardly and axially inwardly away from the mouth of the bolt and lock recess portion whereby to minimize possibility of water entering the lock mechanism, but actually facilitating run-off of water by sloping away from the lock and the recess within which the lock is accommodated. By preference, the flange 43 is inset relative to an annular radially outwardly projecting crown rib 44 which serves as a protection against curbing or like damage to the lock mechanism. It will be observed that the radially inner side wall of the rib 44 slopes divergently away from the radially outer juncture of the flange 43 therewith, thus further implementing drain-off.

In order to effect removal of the cover 7, therefore, it is necessary not only to remove the lock 38 by means of the proper key K, where such lock is provided, but also to have a suitable wrench in order to remove the attachment screw 34. In addition, of course it is also necessary to have an attachment spider of the proper construction in order to use the cover 7. Thereby theft of the cover is substantially discouraged.

Where it is desired to attach the cover retaining spider permanently to the wheel body, the expedient shown in FIGURE 3 may be employed. Therein a spider which may be of substantially the construction shown in FIGURE 2 has legs or arms 27' provided with terminal or foot flanges 45 which may be secured permanently as by means of respective rivets 47 to the axially outer respective faces of the wheel body embossments 13. In other respects, the spider of FIGURE 3 and other details of the cover and wheel may be substantially the same as shown in FIGURE 2.

It will be understood that modifications and variations may be effected without departing from the scope of the novel concepts of the present invention.

I claim as my invention:

1. In a wheel structure including a wheel body having a central bolt-on flange, a cover for disposition over the outer side of the wheel, and means for attaching the cover centrally to the wheel including a spider member having resilient legs with terminal portions thereof engaging the bolt-on flange and means for detachably securing the cover centrally to the spider, the bolt-on flange having slots therein and the terminal portions of the spider legs having snap-in flange structure engageable through said apertures.

2. In a cover for disposition at the outer side of a vehicle wheel, a cover member having a crown portion with a central inset portion providing a recess of substantial depth with means in the bottom of the recess for attaching the cover to a wheel, the wall defining said recess having adjacent the mouth of the recess keeper openings, and a lock member removably engageable over the outer side of the recess and having retractable bolts engageable in said keeper openings, said cover crown having about said inset recess portion an annular axially outwardly extending protective rib that projects axially outwardly beyond the axially outermost plane across the lock and serving as a protection against curbing or like damage to the lock member when the cover member is in running position on a wheel.

3. In a wheel structure including a wheel body having a central bolt-on flange portion, a cover retaining spider member having a central body for overlying the bolt-on flange in axially outwardly spaced relation and provided with generally axially inwardly and radially extending resilient arms provided with return-bent generally axially outwardly projecting terminal locking flanges, the wheel body having slots therein through which the terminal end portions of the spider arms are engaged with the locking flanges engaging the axially inner side of the wheel body adjacent to the slots and thereby locking the arms against removal from the wheel body, the arms having shoulders thereon opposing the axially outer side of the wheel body adjacent the apertures.

4. In a wheel structure, a cover retaining spider having a central body portion for receiving cover attaching means, and a plurality of generally radially extending arched resilient arms, said arms having at the terminal end thereof retaining terminals projecting generally axially and provided with return-bent locking flanges, and shoulders on the arms spaced axially outwardly from the tips of the locking terminal flanges and adapted to engage a wheel portion between the shoulders and the tips of the locking flanges.

References Cited in the file of this patent

UNITED STATES PATENTS

| | | |
|---|---|---|
| 1,430,837 | Oakes | Oct. 3, 1922 |
| 1,975,948 | Jandus | Oct. 9, 1934 |
| 2,147,049 | Lyon | Feb. 14, 1939 |
| 2,329,945 | Schatzman | Sept. 21, 1943 |
| 2,447,516 | Lyon | Aug. 24, 1948 |
| 2,491,503 | Lyon | Dec. 20, 1949 |
| 2,535,126 | Flowers et al. | Dec. 26, 1950 |
| 2,547,031 | Lyon | Apr. 3, 1951 |
| 2,727,790 | Gaylord | Dec. 20, 1955 |

FOREIGN PATENTS

| | | |
|---|---|---|
| 320,285 | Great Britain | Oct. 10, 1929 |
| 47,122 | France | Jan. 18, 1937 |
| | (First addition of 776,248) | |
| 462,025 | Great Britain | Feb. 26, 1937 |
| 526,576 | Great Britain | Sept. 20, 1940 |